United States Patent
Igarashi et al.

(10) Patent No.: US 12,131,486 B2
(45) Date of Patent: Oct. 29, 2024

(54) OBJECT TRACKING DEVICE, OBJECT TRACKING METHOD, AND RECORDING MEDIUM

(71) Applicant: NEC Corporation, Tokyo (JP)

(72) Inventors: Hiroaki Igarashi, Tokyo (JP); Seiya Shibata, Tokyo (JP); Liang Feng, Tokyo (JP)

(73) Assignee: NEC CORPORATION, Tokyo (JP)

( * ) Notice: Subject to any disclaimer, the term of this patent is extended or adjusted under 35 U.S.C. 154(b) by 368 days.

(21) Appl. No.: 17/628,317

(22) PCT Filed: Jul. 25, 2019

(86) PCT No.: PCT/JP2019/029218
§ 371 (c)(1),
(2) Date: Jan. 19, 2022

(87) PCT Pub. No.: WO2021/014643
PCT Pub. Date: Jan. 28, 2021

(65) Prior Publication Data
US 2022/0284595 A1    Sep. 8, 2022

(51) Int. Cl.
*G06K 9/00* (2022.01)
*G06T 7/12* (2017.01)
*G06T 7/223* (2017.01)
*G06T 7/70* (2017.01)
*G06T 7/90* (2017.01)

(52) U.S. Cl.
CPC ............... *G06T 7/223* (2017.01); *G06T 7/12* (2017.01); *G06T 7/70* (2017.01); *G06T 7/90* (2017.01);
(Continued)

(58) Field of Classification Search
CPC ...... G06V 10/82; G06V 10/764; G06V 20/41; G06V 20/46; G06V 20/58; G06V 10/25;
(Continued)

(56) References Cited

U.S. PATENT DOCUMENTS

| 2006/0088191 A1* | 4/2006 | Zhang | G06V 20/40 |
| | | | 382/103 |
| 2016/0125274 A1* | 5/2016 | Zhou | G06F 18/24 |
| | | | 382/160 |

(Continued)

FOREIGN PATENT DOCUMENTS

| JP | 2002-259986 A | 9/2002 |
| JP | 2019-101737 A | 6/2019 |

OTHER PUBLICATIONS

International Search Report for PCT Application No., PCT/JP2019/029218, mailed on Sep. 24, 2019.
(Continued)

*Primary Examiner* — Alex Kok S Liew

(57) ABSTRACT

An object tracking device includes an object detection unit and a matching unit. The object detection unit includes a plurality of detectors having different processing speeds or accuracy. The object detection unit detects, for each of frames of image data input in time series, each object from the image data using one detector selected from the plurality of the detectors. The matching unit matches a current object detection result which the object detection unit generates from image data of a current frame with a previous object detection result which the object detection unit generates from image data of a previous frame before the current frame, and generates a tracking result of the object based on a matching result.

11 Claims, 11 Drawing Sheets

(52) U.S. Cl.
CPC ............... *G06T 2207/10024* (2013.01); *G06T 2207/20021* (2013.01)

(58) Field of Classification Search
CPC .. G06V 10/454; G06V 20/49; G06V 2201/07; G06V 20/52; G06V 10/62; G06V 10/774; G06V 20/40; G06V 40/161; G06V 20/10; G06V 20/70; G06V 40/172; G06V 10/255; G06V 20/44; G06V 20/56; G06V 10/50; G06V 10/776; G06T 2207/20084; G06T 2207/20081; G06T 2207/10016; G06T 7/248; G06T 7/70; G06T 2207/30196; G06T 2210/12; G06T 7/20; G06T 7/246; G06T 2207/30201
See application file for complete search history.

(56) References Cited

U.S. PATENT DOCUMENTS

| | | | |
|---|---|---|---|
| 2019/0147602 A1* | 5/2019 | Tao ...................... | G06V 10/809 382/103 |
| 2020/0082549 A1* | 3/2020 | Dehghan .............. | G06V 40/172 |

OTHER PUBLICATIONS

Breitenstein et al., "Robust Tracking-by-Detection using a Detector Confidence Particle Filter". Computer Vision Laboratory. 2009 IEEE 12th International Conference on Computer Vision (ICCV), pp. 1515-1522.

* cited by examiner

FIG. 4

| DETECTION FRAME | CLASS | RELIABILITY (=DETECTOR ID) | LOCATION |
|---|---|---|---|
| N-3 | PERSON | 3 | x,y,w,h |
| N-2 | VEHICLE | 1 | x,y,w,h |
| . | . | . | . |
| . | . | . | . |

<POSITION CORRECTION>

OBJECT TRACKING DEVICE, OBJECT TRACKING METHOD, AND RECORDING MEDIUM

This application is a National Stage Entry of PCT/JP2019/029218 filed on Jul. 25, 2019, the contents of all of which are incorporated herein by reference, in their entirety.

TECHNICAL FIELD

The present invention relates to a technique for tracking objects contained in an image.

BACKGROUND ART

Recently, an accuracy of an object detector has been improved by an advance of a deep neural network, and a technique, which tracks the object by matching an object detected from multiple frame images, has been proposed. In order to carry out object tracking in real time using photographed images such as surveillance cameras, the speed of an object detection process becomes a problem. Patent Document 1 describes an image identification device that performs identification at high speed while suppressing a decrease in detection accuracy by selectively using a low-accuracy high-speed discriminator and a high-accuracy low-speed discriminator.

PRECEDING TECHNICAL REFERENCES

Patent Document

Patent Document 1: Japanese Patent Application Laid-open under No. 2019-101737

SUMMARY

Problem to be Solved by the Invention

However, a method described in Patent Document 1 assumes an environment in which a processing load in the first half of processing is relatively small and the processing load thereafter is increased, and the deterioration of accuracy is inevitable in an environment in which the processing load is high from the start of the processing. In addition, Patent Document 1 does not particularly describe a method of tracking using a detection result of an object.

An example object of the present invention is to provide an object tracking device capable of tracking an object at high speed and with high accuracy using a plurality of detectors having different characteristics.

Means for Solving the Problem

According to an example aspect of the present invention, there is provided an object tracking device comprising:

an object detection unit configured to include a plurality of detectors having different processing speeds or accuracies and to detect, for each of frames of image data input in time series, each object from the image data using one detector of the plurality of detectors, the one detector selected from the plurality of the detectors; and a matching unit configured to match a current object detection result which the object detection unit generates from image data of a current frame with a previous object detection result which the object detection unit generates from image data of a previous frame before the current frame, and generate a tracking result of the object based on a matching result.

According to another example aspect of the present invention, there is provided an object tracking method, comprising:

detecting each object from image data by using one detector selected from a plurality of detectors having different processing speeds or accuracies for each of frames of the image data input in time series and generating an object detection result; and matching a current object detection result generated from image data of a current frame with a previous object detection result generated from image data of a previous frame before the current frame, and generating a tracking result of the object based on a matching result.

According to still another example aspect of the present invention, there is provided recording medium recording a program, the program causing a computer to perform a process comprising:

detecting each object from image data by using one detector selected from a plurality of detectors having different processing speeds or accuracies for each of frames of the image data input in time series and generating an object detection result; and matching a current object detection result generated from image data of a current frame with a previous object detection result generated from image data of a previous frame before the current frame, and generating a tracking result of the object based on a matching result.

Effect of the Invention

According to the present invention, it is possible to track an object at high speed and with high accuracy using a plurality of detectors having different characteristics.

BRIEF DESCRIPTION OF THE DRAWINGS

FIG. 4 illustrates an example of information stored in a buffer memory.

EXAMPLE EMBODIMENTS

In the following, preferred example embodiments of an object tracking device according to the present invention will be described with reference to the accompanying drawings.

[Basic Principle]

Figure 1A:
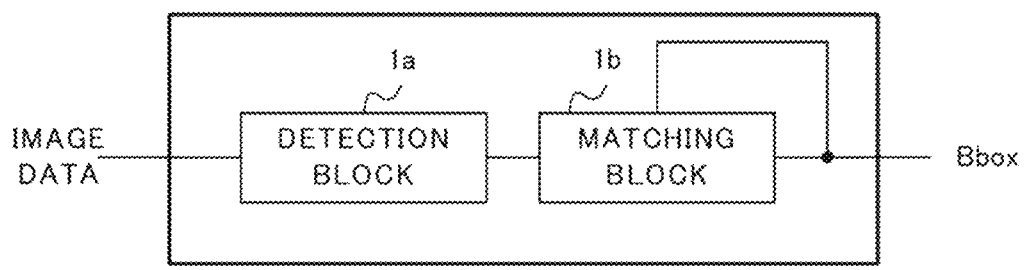
FIG. 1A and FIG. 1B are diagrams illustrating a basic principle of an object tracking.
Figure 1B:
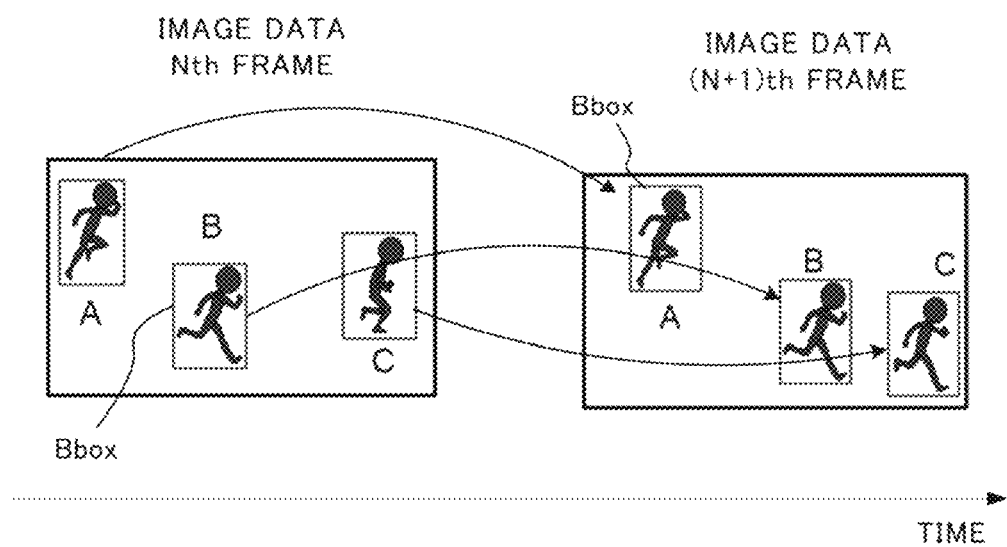

First, a basic principle of object tracking by an object tracking device of an example embodiment will be described. In the present example embodiment, an object is tracked by a technique called tracking by detection (Tracking by Detection). FIG. 1A and FIG. 1B are diagrams illustrating the basic principle of the object tracking. As shown in FIG. 1A, an object tracking device 1 includes a detection block 1a and a matching block 1b. The detection block 1a detects an object from each of frame images of input image data and supplies an object detection result to the matching block 1b. The object detection result is information of a boundary region ("bounding box (Bounding Box)" (hereinafter, also referred to as "Bbox") including the object detected in the image data. FIG. 1B illustrates a sample Bbox detected from image data. In a n-th frame and a (n+1) th frame of the image data, three Bboxes being in the same class (here, referred to as a "person") have been detected.

The matching block 1b stores a previous object detection result in an internal memory or the like, and matches a Bbox detected in a frame image with a Bbox detected in a previous frame image. In an example of FIG. 1B, the matching block 1b performs matching between three Bboxes detected in the n-th frame and three Bboxes detected in the (n+1)th frame, and determines correspondences of the respective Bboxes as indicated by arrows. Then, the matching block 1b outputs information of each matched (successfully matched) Bbox as an object tracking result. Specifically, as the object tracking result, for each Bbox, the matching block 1b outputs the ID of the object included in the Bbox (for instance, "person A", "person B", or the like) and a position in the frame image of the Bbox. Also, the information of the matched Bbox is stored in the internal memory of the matching block 1b and is used for matching after the next frame. As described above, the object tracking is performed by detecting objects from frame images and matching among the detected objects.

First Example Embodiment

Next, a first example embodiment of the present invention will be described.

(Hardware Configuration)

Figure 2:
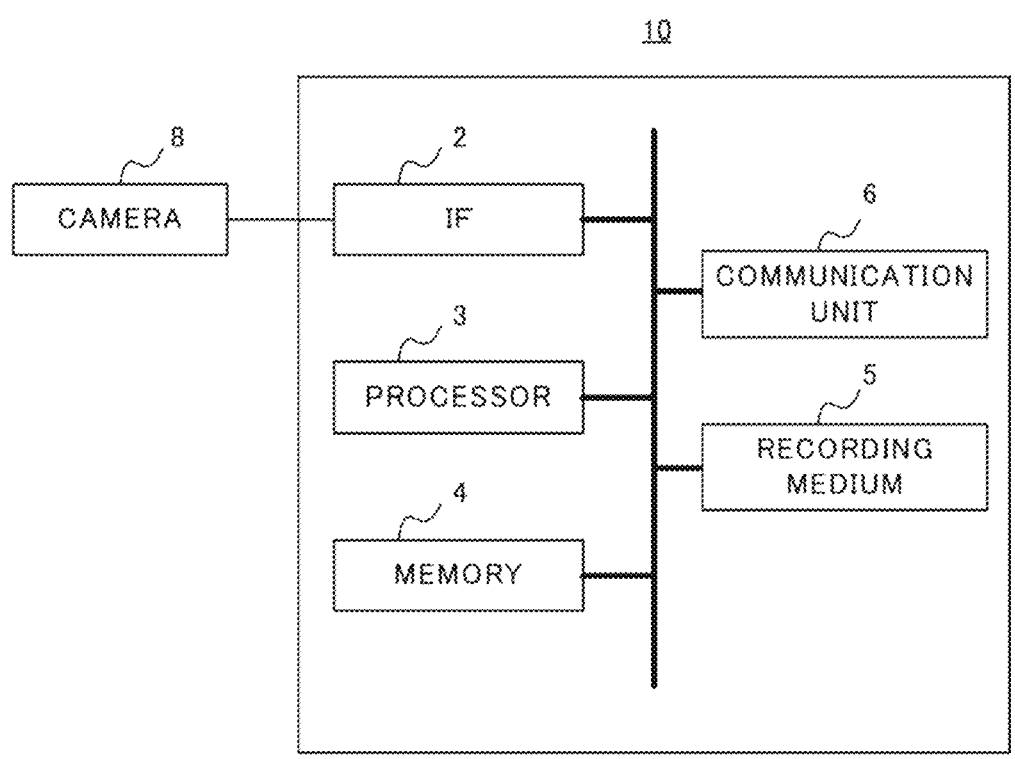
FIG. 2 is a block diagram illustrating a hardware configuration of an object tracking device.

FIG. 2 is a block diagram illustrating a hardware configuration of an object tracking device 10 according to the first example embodiment. The object tracking device 10 can be used as an edge device to be installed on a site together with a surveillance camera, for example, in a commercial surveillance system. The object tracking device 10 is connected to a camera 8. The object tracking device 10 includes an interface (IF) 2, a processor 3, a memory 4, a recording medium 5, and a communication unit 6.

The interface 2 communicates with an external device. Specifically, the interface 2 is connected to the camera 8 and acquires image data taken by the camera 8. The processor 3 is a computer such as a CPU (Central Processing Unit) or a GPU (Graphics Processing Unit) in addition to a CPU, and controls the entire object tracking device 10 by executing a program prepared in advance. The memory 4 includes a ROM (Read Only Memory), a RAM (Random Access Memory), or the like. The memory 4 stores various programs to be executed by the processor 3. Also, the memory 4 is used as a work memory during executions of various processes by the processor 3.

The recording medium 5 is a non-volatile and non-transitory recording medium such as a disk-shaped recording medium, a semiconductor memory, or the like, and is formed to be detachable from the object tracking device 10. The recording medium 5 records various programs, which are executed by the processor 3. When the object tracking device 10 performs an object tracking process, a program recorded on the recording medium 5 is loaded into the memory 4 and is executed by the processor 3. The communication unit 6 transmits the object tracking result obtained by the object tracking process to an external server device or the like as necessary.

(Functional Configuration)

Figure 3:
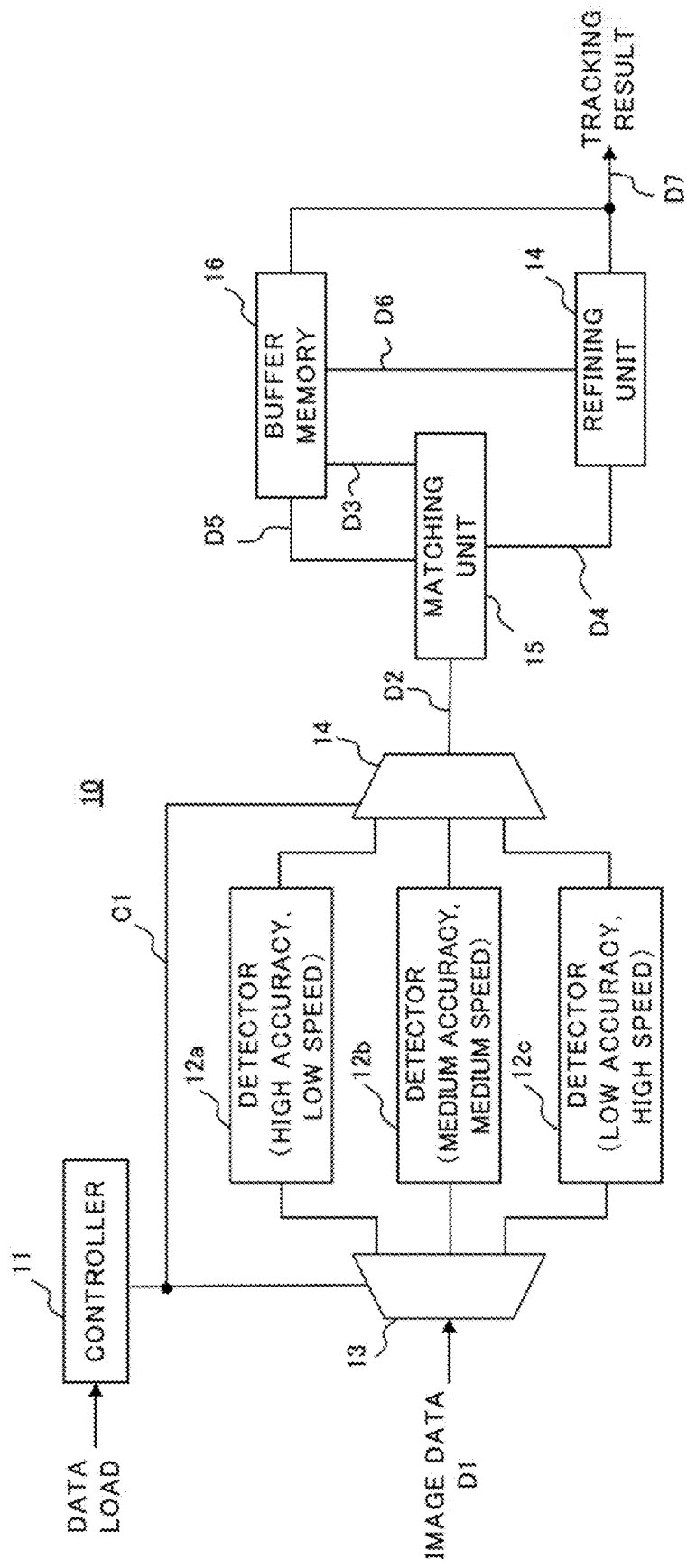
FIG. 3 is a block diagram illustrating a functional configuration of the object tracking device according to the first example embodiment.

Next, a functional configuration of the object tracking device 10 will be described. FIG. 3 is a block diagram illustrating the functional configuration of the object tracking device 10 according to the first example embodiment. As shown, the object tracking device 10 functionally includes a controller 11, a plurality of detectors 12 (12a to 12c), selectors 13 and 14, a matching unit 15, a buffer memory 16, and a refining unit 17. In the following description, one detector specified among the three detectors is described with a subscript such as "detector 12a", and a detector is simply described as "detector 12" when not restricted to any one of them.

In the present example embodiment, the object tracking device 10 includes three detectors 12a to 12c. The detectors 12a to 12c detect objects from input image data and output the object detection results. Here, it is assumed that the three detectors 12a to 12c are different in detection accuracy or detection speed with respect to the objects. Specifically, in an example in FIG. 3, the detector 12a shows high accuracy but low speed, the detector 12c shows low accuracy but high speed, and those of the detector 12b show between the detectors 12a and 12c; that is, it is assumed as medium accuracy with medium speed.

Image data D1 input from the camera 8 are supplied to the selector 13. The image data D1 are time series data and is formed by a plurality of frame images. The controller 11 controls selectors 13 and 14 by a control signal C1, and selects one detector 12 among the three detectors 12a to 12c for each frame image. The selector 14 outputs an object detection result D2 by any of the detectors 12a to 12c to the matching unit 15. The object detection result D2 includes an ID of the detector 12 that has performed the object detection, a class of the detected object, and a position of a Bbox including the object.

The buffer memory 16 stores the object detection result D2 acquired by the detector 12, that is, information of the detected Bbox. Specifically, the buffer memory 16 stores information of the Bbox detected from the previous frame image. Incidentally, it is preferable that the buffer memory 16 stores Bboxes for several frames at all times, considering a case in which the tracked object is not able to be detected for a few frames due to occlusion, a case in which the object tracking is performed for a long time, or other cases.

FIG. 4 illustrates an example of the information of the Bboxes stored in the buffer memory 16. The information of the Bboxes includes a "DETECTED FRAME", a "CLASS", a "RELIABILITY", and a "LOCATION". The "DETECTED FRAME" indicates a frame number of the image data in which a Bbox is detected. The "CLASS" shows a class that indicates an object contained in the Bbox. In practice, a class code or the like indicating each class is stored. The "RELIABILITY" indicates reliability of that Bbox information. Incidentally, since the reliability of each Bbox depends on a detection accuracy of the detector 12 that has detected that Bbox, it is possible to use the ID of the detector 12 as the reliability. In the present example embodiment, it is assumed that the reliability of a Bbox detected by the detector 12a indicates "3", the reliability of a Bbox detected by the detector 12b indicates "2", and the reliability of a Bbox detected by the detector 12c indicates "1". The higher a reliability value, the higher the reliability. The "POSITION" is a position of the Bbox in a frame image, including a x-coordinate and a y-coordinate relative to the reference position in that frame image, and a width w and a height h of that Bbox.

The matching unit 15 matches Bboxes included in the object detection result D2 input from the selector 14; that is, matching unit 15 matches the Bboxes included in the frame image currently being processed, with Bboxes of the same class and detected from a previous frame image. Specifically, the matching unit 15 acquires information D3 of a Bbox detected in the previous frame image from the buffer memory 16, and matches it with a Bbox detected from the current frame image. Incidentally, in a case of obtaining a Bbox from the buffer memory 16, it is preferred that the matching unit 15 obtains first from reliable ones. Then, the matching unit 15 supplies information D4 of the matched (successfully matched) Bbox to the refining unit 17, information D5 of a Bbox that has not been matched (is failed to match) to the buffer memory 16. The matching unit 15 performs matching using a color histogram, and details thereof will be described later.

Using a result of matching by the matching unit 15, the refining unit 17 refines a less reliable Bbox, that is, a Bbox detected by detector 12 of low accuracy. Specifically, among two Bboxes which the matching unit 15 is determined to match to each other, the refining unit 17 corrects one Bbox detected by the detector 12 of the low accuracy (hereinafter, referred to as "low-accuracy Bbox") based on another Bbox detected by the detector 12 of high-accuracy (hereinafter, referred to as "high-accuracy Bbox"). Incidentally, only when the reliability of the low-accuracy Bbox is equal to or less than a predetermined value, the refining unit 17 may refine the low-accuracy Bbox.

Among two Bboxes determined to be matched by the matching unit 15, if one Bbox detected from the current frame image is the high-accuracy Bbox, and another Bbox detected from the previous frame image is the low-accuracy Bbox, the refining unit 17 refines the Bbox detected from the previous frame image based on the Bbox detected from the current frame image. On the other hand, among two Bboxes determined to be matched by the matching unit 15, when one Bbox detected from the current frame image is the low accuracy Bbox and another Bbox detected from the previous frame image is the high accuracy Bbox, the refining unit 17 acquires information D6 of the high accuracy Bbox detected from the previous frame image from the buffer memory 16, and refines the Bbox detected from the current frame image based on this information. Then, the refining unit 17 stores information D7 of the refined Bbox in the buffer memory 16, and also outputs a result as a tracking result. Incidentally, a refining process by the refining unit 17 includes a size correction of a Bbox, and a position correction of the Bbox, and will be described later in detail.

In the above configuration, the controller 11, the detectors 12, the selectors 13 and 14 are examples of an object detection unit in the present invention, the matching unit 15 is an example of a matching unit in the present invention, the refining unit 17 is an example of a correction unit in the present invention, and the buffer memory 16 is an example of a storage unit in the present invention.

(Selection Method of Detector)

Next, a method of selecting the detector 12 by the controller 11 will be described in detail. The controller 11 selects one detector 12 for each frame of the image data D1. As shown, data load is input to the controller 11. The data load is information indicating an amount of the image data to be processed by the object tracking device 10, for example, an amount of the image data input from the camera 8. The controller 11 selects one detector 12 from three detectors 12a to 12c depending on the data load. For example, the controller 11 controls the selectors 13 and 14 in order to frequently select the high-speed detector 12c when the data load is large and to frequently select the high-accuracy detector 12a when the data load is small.

However, even when the data load is large, the controller 11 selects the detector 12a of the highest accuracy once for every predetermined number (represented as "N") of frames of the image data D1. For example, the controller 11 selects the detector 12a of the highest accuracy once for each N (hereinafter referred to as "N=10") frames of the image data D1 to be input. At the beginning of the object tracking process, the controller 11 selects the detector 12a for the first frame of the input image data D1, and then selects the detector 12a once for every 10 frames. Moreover, the controller 11 may adjust a frequency of selecting the detector 12a of the highest accuracy, that is, the above-described "N", depending on the data load. That is, the controller 11 is assumed to select the detector 12a once in the N frames as the default setting, and the controller 11 increases N when the data load increases and decreases N when the data load decreases. In an example, the controller 11 selects the detector 12a once in 10 frames at the default setting, selects the detector 12a once in 15 frames when the data load is increased, and selects the detector 12a once in 5 frames when the data load is decreased. By this control, it is possible to optimize accuracy of the tracking result and speed of tracking process depending on the data load.

(Matching Process)

Next, the matching process by the matching unit 15 will be described in detail. The matching unit 15 performs matching one Bbox detected in one frame image and another Bbox detected in a previous frame image using a color histogram.

Figure 5A:
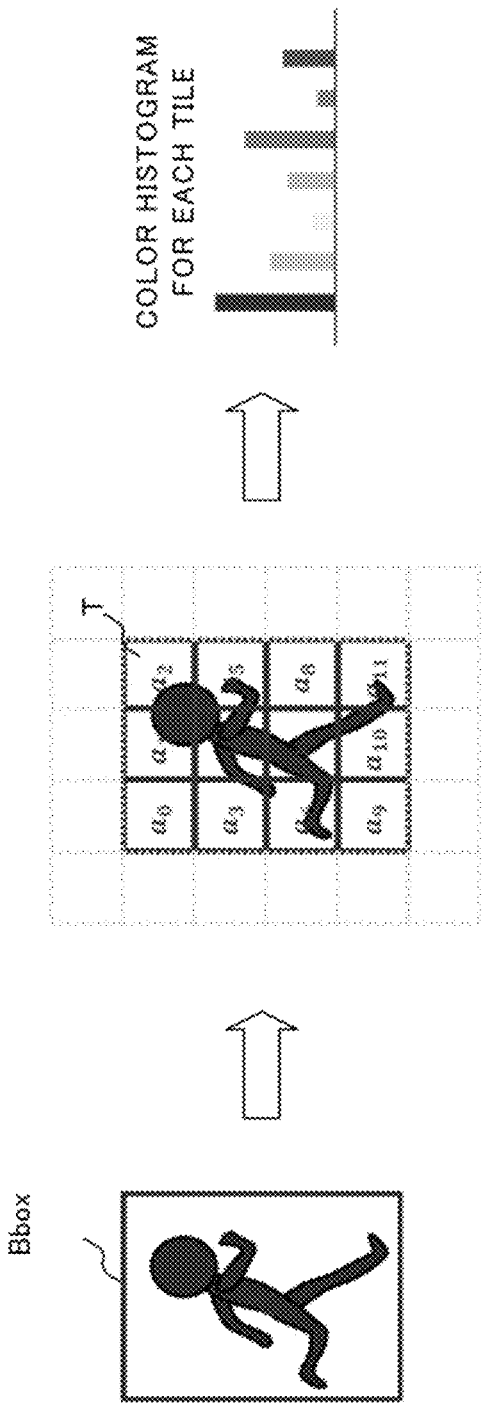
FIG. 5A and FIG. 5B are diagrams illustrating a method of matching using a color histogram.
Figure 5B:
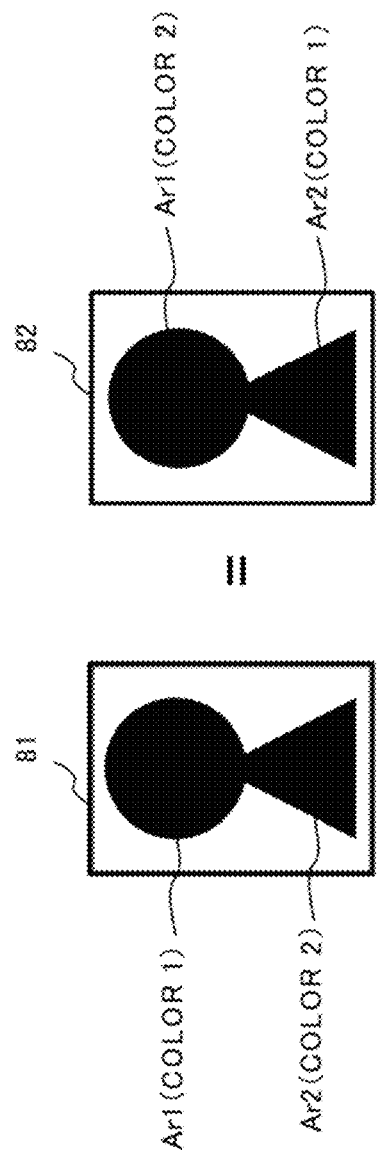

FIG. 5A and FIG. 5B are diagrams illustrating a method of matching using the color histogram. The matching unit 15 divides a Bbox detected by the detector 12 into a predetermined number of partial regions (hereinafter, referred to as "tiles T"). In an example in FIG. 5A, the matching unit 15 divides one Bbox into 12 tiles T, and calculates $a_0$ to $a_{11}$ of the color histogram for each tile T (hereinafter, also referred to as "partial histogram"). The matching unit 15 adds 12 partial histograms $a_0$ to $a_{11}$ using an equation (1) and calculates an evaluation index $F_1$ of the color histogram (hereinafter, referred to as "entire histogram") for the entire Bbox.

[Math 1]

$$F_1 = \Sigma_i a_i \tag{I}$$

The matching unit 15 performs a weighting addition with respect to the partial histogram $a_0$ to $a_{11}$ using weight parameters $w_i$, and calculates an evaluation index $F_2$ of the partial histogram according to an equation (2).

[Math 2]

$$F_2 = \Sigma_i w_i a_i \tag{2}$$

Next, the matching unit 15 adds the evaluation index $F_1$ of the entire histogram and the evaluation index $F_2$ of the partial histogram, and calculates the evaluation index F of an equation (3).

[Math 3]

$$F = F_1 + F_2 = \Sigma_i a_i + \Sigma_i w_i a_i \tag{3}$$

The matching unit 15 calculates evaluation indices F for Bboxes output from the selector 14, that is, Bboxes included in a present frame image, and Bboxes included in a previous frame image, and calculates their similarities to perform matching. Here, the partial histograms are used for matching due to the following reasons. Assume that a Bbox 81 and a Bbox 82 shown in FIG. 5B are matched using only the entire histogram. The Bbox 81 has a circular area Ar1 of a color 1 and a triangular area Ar2 of a color 2. On the other hand, the Bbox 82 has the circular area Ar1 of the color 2 and the triangular area Ar2 of the color 1. In a case of calculating the evaluation index $F_1$ of the entire histogram for these two Bboxes, since the area Ar1 and the area Ar2 are a similar area size, the evaluation index $F_1$ calculated for the Bbox 81 and the evaluation index $F_1$ calculated for the Bbox 82 are almost the same. Therefore, it is erroneously determined that the different Bboxes 81 and 82 are actually matched.

Therefore, in the present example embodiment, in addition to the entire histogram, the evaluation index F is calculated using the partial histogram, and the matching is performed. By these processes, the matching is performed in consideration of color components of each tile T in each Bbox, and thus, it is possible to realize accurate matching. In the example described above, the matching is performed using a similarity of the evaluation index F obtained by adding the evaluation index $F_1$ of the entire histogram and the evaluation index $F_2$ of the partial histograms. Instead, for each of the evaluation index $F_1$ of the entire histogram and the evaluation index $F_2$ of the partial histograms, the similarity between the two Bboxes may be determined individually, and the matching is performed by combining the determination result.

(Refining Process)

Next, the refining process by the refining unit 17 will be described. As described above, among the two Bboxes matched by the matching process, the refining unit 17 refines the low-accuracy Bbox based on the high-accuracy Bbox. Here, the refining process includes a size correction of a Bbox and a position correction of the Bbox.

Figure 6:
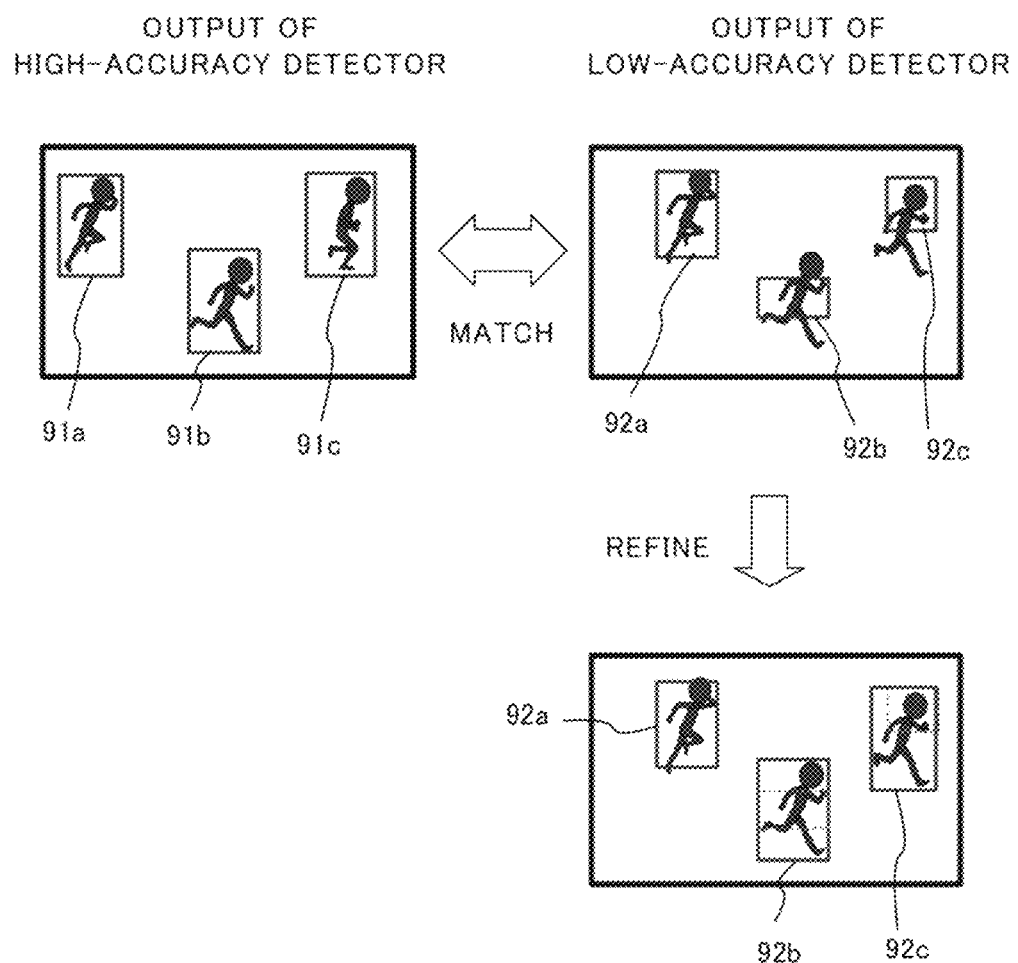
FIG. 6 is a diagram illustrating a size correction method by a refining unit.

First, the size correction of the Bbox will be described. FIG. 6 is a diagram illustrating a size correction method by the refining unit 17. As shown, it is assumed that high-accuracy Bbox 91*a*, 91*b*, and 91*c* detected by the high-accuracy detector 12 from one frame image are matched respectively to the low-accuracy Bboxes 92*a*, 92*b*, and 92*c*, detected by the low-accuracy detector 12 from another frame image. A position of the low-accuracy Bbox detected by the low-accuracy detector 12 has a certain degree of accuracy; however, the accuracy of the size is often low. Thus, for two Bboxes corresponding to each other, the refining unit 17 corrects the size of the low-accuracy Bbox based on the high-accuracy Bbox. Preferably, the refining unit 17 makes a size of the low-accuracy Bbox match with a size of the high-accuracy Bbox when there is a difference equal to or greater than a certain value between the sizes of the two Bboxes. In the example in FIG. 6, the refining unit 17 matches the size of the low-accuracy Bbox 92*b* with the size of the high-accuracy Bbox 91*b*, and matches the size of the low-accuracy Bbox 92*c* with the size of the high-accuracy Bbox 91*c*. In the example in FIG. 6, the difference between the high-accuracy Bbox 91*a* and the low-accuracy Bbox 92*a* is smaller than a constant value, the refining unit 17 does not perform the size correction with respect to the low-accuracy Bbox 92*a*.

Figure 7A:
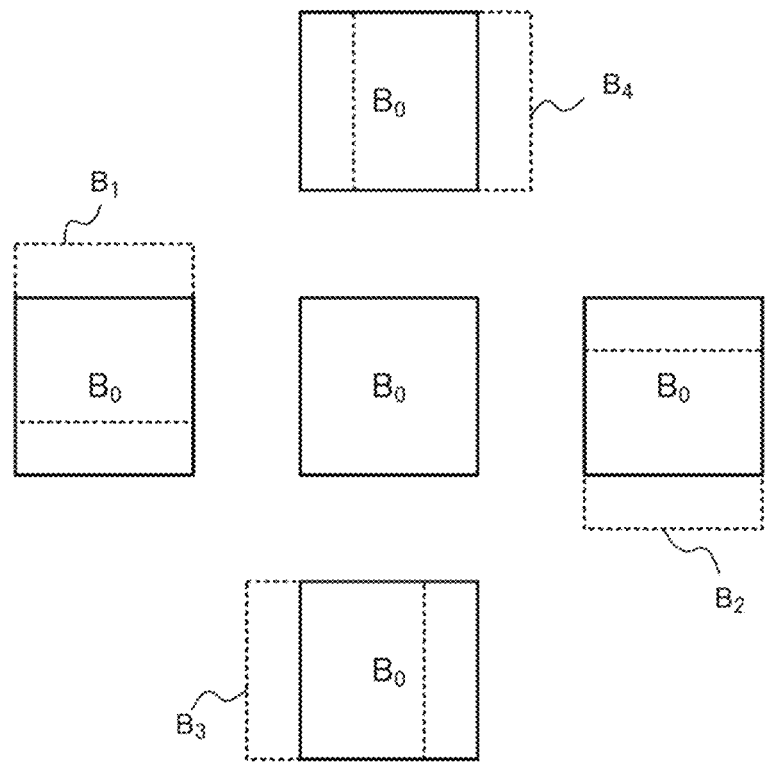
FIG. 7A, FIG. 7B, and FIG. 7C are diagrams illustrating a position correction method by the refining unit 17.
Figure 7B:
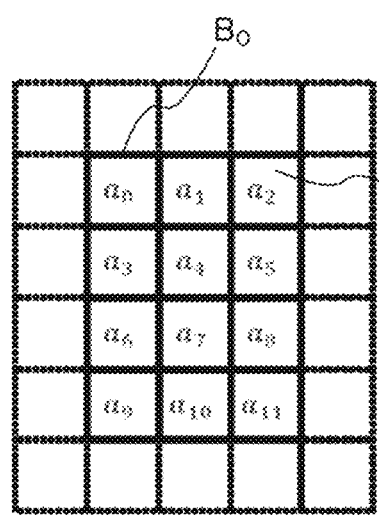

Next, the position correction of the Bbox will be described. FIG. 7A and FIG. 7B are diagrams illustrating the position correction method by the refining unit 17. As illustrated, when a low-accuracy Bbox $B_0$ is detected by the low-accuracy detector 12, the refining unit 17 creates Bboxes $B_1$ to $B_4$ (hereinafter, referred to as "shift Bboxes") by shifting positions by predetermined vertical and horizontal amounts. Then, the refining unit 17 calculates the similarity to the corresponding high-accuracy Bbox by using the evaluation index F of the color histogram used in the matching process described above. Specifically, the refining unit 17 calculates the evaluation index F for each of the shift Bbox $B_1$ to $B_4$, and also calculates the evaluation index F for a corresponding high-accuracy Bbox. Among the shift Bboxes $B_1$ to $B_4$, the refining unit 17 regards a shift Bbox of the highest similarity with the evaluation index F calculated with respect to the high-accuracy Bbox as a Bbox including proper position information, and changes a position of the low-accuracy Bbox $B_0$ to a position of the shift Bbox. For example, in FIG. 7A, in a case where the evaluation index F of the shift Bbox $B_2$ shifted downward the low-accuracy Bbox $B_0$ is closest to the evaluation index F of the high-accuracy Bbox, the refining unit 17 corrects a position of the low-accuracy Bbox $B_0$ to a position of the shift Bbox $B_2$. By this correction, it is possible to correct a position of the low-accuracy Bbox based on the position of the matched high-accuracy Bbox.

Figure 7C:
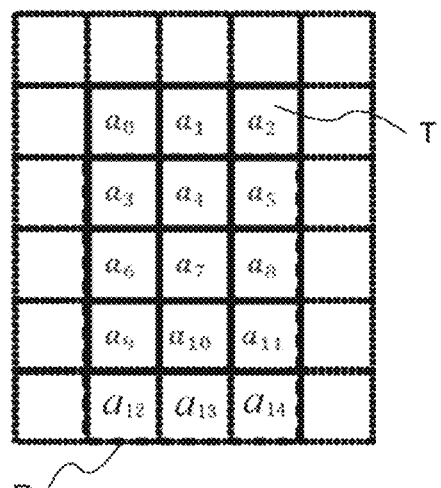

Since the above described position correction uses the partial histogram previously calculated in the matching process, there is an advantage that it is possible to improve an efficiency of an arithmetic process. Specifically, in a case of calculating shift Bboxes $B_1$ to $B_4$ with respect to the low-accuracy Bbox $B_0$, the refining unit 17 is able to use a partial histogram, which has already been calculated in the matching process as a part thereof. Now, it is assumed that the low-accuracy Bbox $B_0$ is formed by 12 tiles as illustrated in FIG. 7B. In this case, the partial histograms $a_0$ to $a_{11}$ for the 12 tiles have already been calculated in the matching process and stored in the buffer memory 16 or another memory. Therefore, in a case of calculating the evaluation index F of the shift Bbox $B_2$, for example, as illustrated in FIG. 7C, the refining unit 17 simply acquires the partial histograms $a_3$ to $a_{11}$ of the 9 tiles from the memory or the like, and newly calculates only the partial histograms $a_{12}$ to $a_{14}$ of the three tiles generated by the shift. As described above, since the refining unit 17 may calculate the partial histograms only for a portion where the low-accuracy Bbox is shifted, a calculation load required for the position correction is small, thereby enabling a quick position correction.

The information D7 of the refined Bbox is stored in the buffer memory 16. At that time, the reliability of the Bbox after being refined is modified to match with the reliability of the high-accuracy Bbox used in the refining process. For instance, in a case of refining a low-accuracy Bbox whose reliability is "1" by using a high-accuracy Bbox whose reliability is "3", the reliability of the Bbox after being refined is modified to "3". Thus, by the refining process, the information of the Bbox stored in the buffer memory 16 is improved in accuracy.

(Process Flow)

Figure 8:
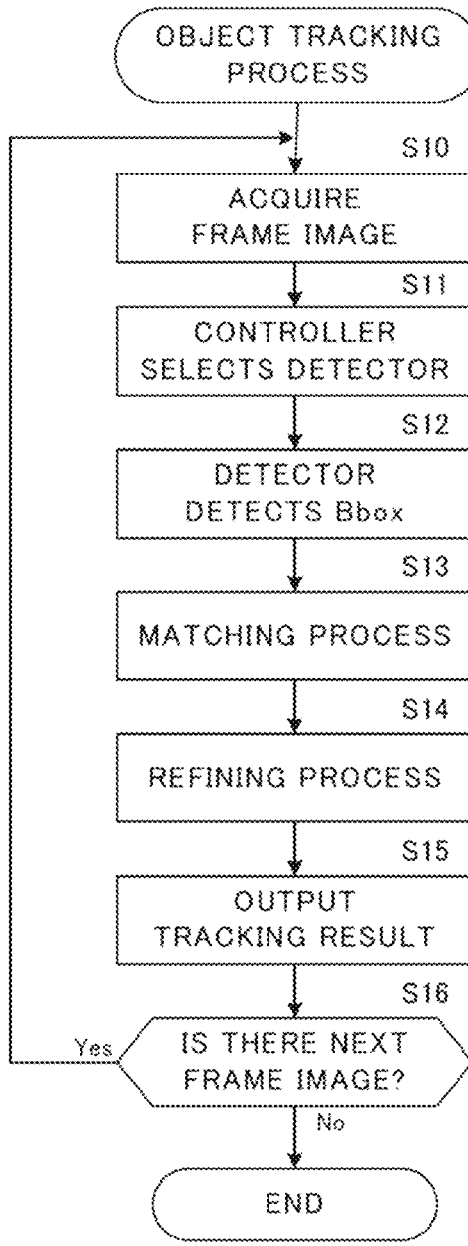
FIG. 8 is a flowchart of an object tracking process.

Next, an entire flow of the object tracking process will be described. FIG. 8 is a flowchart of the object tracking process. This process is realized by the processor 3 illustrated in FIG. 2, which executes a program prepared in advance and operates as each of elements depicted in FIG. 3.

First, the object tracking device 10 acquires a frame image from the camera 8 (step S10). The image data D1 input from the camera 8 is time-series data including a plurality of frame images, and the object tracking device 10 acquires one frame image among the plurality of frame images. Next, the controller 11 selects one of the plurality of the detectors 12a to 12c in the above described method (step S11), and the detector 12 selected by the controller 11 performs an object detection with respect to the frame image and detects a Bbox (step S12).

Next, the matching unit 15 performs the matching process described above (step S13). That is, the matching unit 15 matches the Bbox detected in step S12, with the Bbox previously detected by the detector 12 and already stored in the buffer memory 16. In other words, the matching unit 15 performs matching between the Bbox detected from the current frame image and the Bbox detected from the previous frame image.

Next, the refining unit 17 performs the above-described refining process (step S14). That is, among the two Bboxes determined to match by the matching unit 15, the refining unit 17 corrects a size and a position of the low-accuracy Bbox based on a size and a position of the high-accuracy Bbox. As described above, when the two Bboxes are successfully matched by the matching unit 15, the size and the position of the low-accuracy Bbox in the two matched Bboxes is corrected and stored in the buffer memory 16. Therefore, even low-accuracy Bbox, which is initially detected by the detector 12 of low accuracy and is stored in the buffer memory 16, is set as a target of the refining process, is thus refined to the high-accuracy Bbox, and is stored in the buffer memory 16. Hence, even in a case of detecting a Bbox using the detector 12 of low accuracy, it is possible to obtain, by a subsequent refining process, the high-accuracy Bbox equivalent to a case of using the detector 12 of high accuracy.

Next, the refining unit 17 stores information of the Bbox obtained by the refining process in the buffer memory 16, and outputs the information as a tracking result (step S15). The tracking result to be output includes, for each of Bboxes, an ID of an object included in the Bbox (for instance, "person A", "person B", or the like) and a position of the Bbox.

Next, in step S16, the object tracking device 10 determines whether or not there is a next frame image to be processed. When there is the next frame image (step S16: Yes), the process returns to step S10, and the object tracking device 10 repeats steps S10 to S15 for the next frame image. On the other hand, when there is no next frame image (step S16: No), the object tracking process is terminated.

As described above, in the object tracking process of the present example embodiment, since the controller 11 selects the detector 12 of an appropriate processing speed and performs the object detection according to a data load of the image data D1 input from the camera 8, it is possible to perform the object tracking in real time. On the other hand, when the data load is large, there are more opportunities for the detector 12 of high speed, that is, the detector 12 of low accuracy to perform the object detection. However, the controller 11 always selects the high-accuracy detector 12 at a predetermined ratio, so that the detection result of high accuracy is included at a predetermined ratio in the detection result by the detector 12. Then, since the refining unit 17 corrects the detection result of low accuracy using the detection result of high accuracy, it is possible to compensate for a decrease in an object detection accuracy by using a detector of low accuracy at high speed. By this process, the object tracking can be realized in real time while suppressing a decrease in accuracy.

Second Example Embodiment

Figure 9:
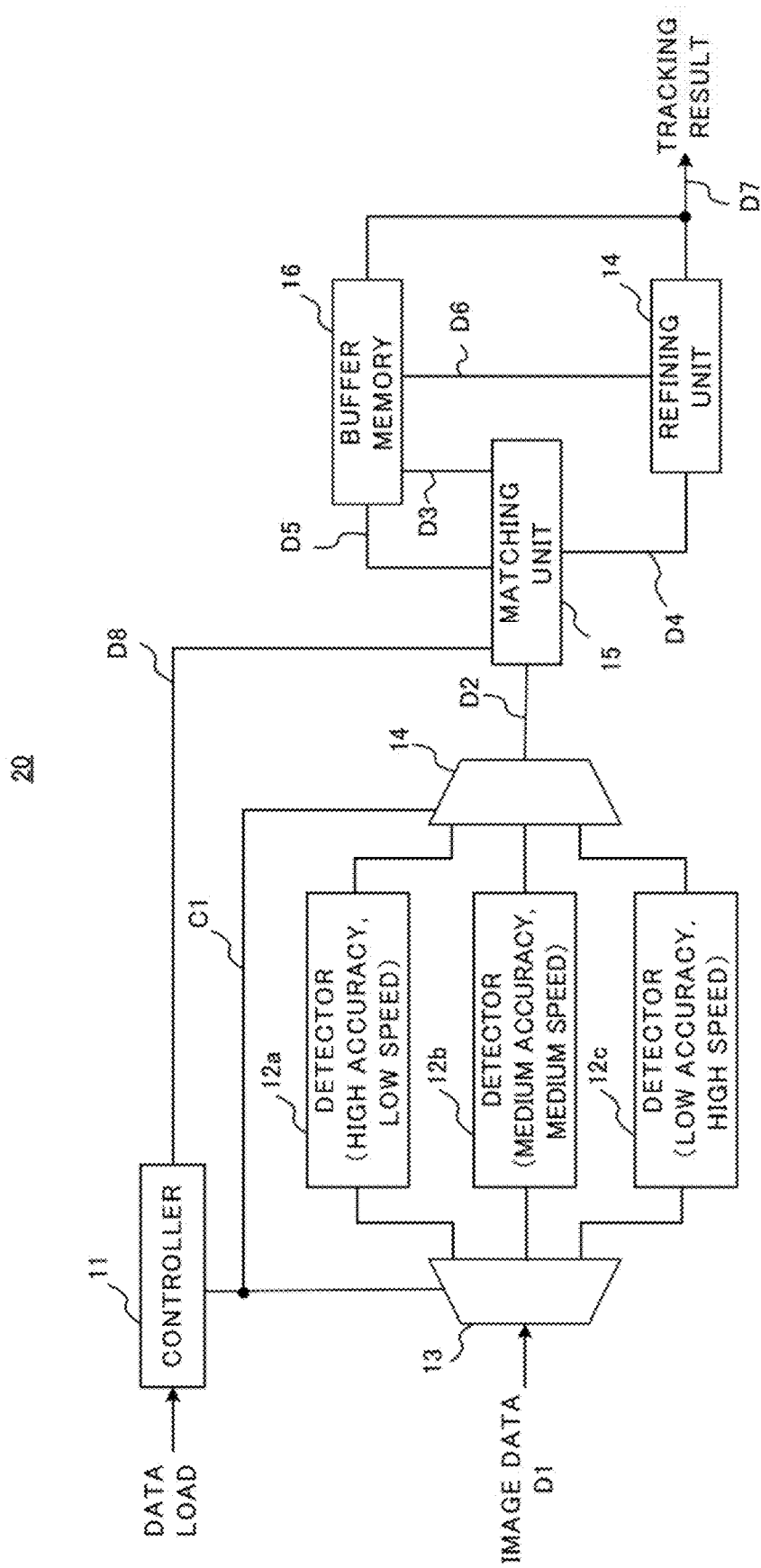
FIG. 9 is a block diagram illustrating a functional configuration of an object tracking device according to a second example embodiment.

Next, a second example embodiment will be described. A hardware configuration of an object tracking device in the second example embodiment is the same as that in the first example embodiment illustrated in FIG. 2. FIG. 9 is a block diagram illustrating a functional configuration of an object tracking device 20 according to the second example embodiment. Different from the first example embodiment, in the second example embodiment, the controller 11 adjusts a selection method of the detector 12 in accordance with a matching result by the matching unit 15; however, other operations are the same as the first example embodiment. Specifically, as illustrated in FIG. 9, a matching result D8 is supplied from the matching unit 15 to the controller 11. In other operations, a configuration of the object tracking device 20 in the second example embodiment is the same as a configuration of the object tracking device 10 in the first example embodiment.

The matching result D8 is information indicating a matching number in the matching unit 15; for example, a success number or a success rate of the matching per unit frame number may be used. When the matching number in the matching unit 15 has decreased, the controller 11 controls the selectors 13 and 14 so as to more frequently select the high-accuracy detector 12. One of causes decreasing the matching number by the matching unit 15 may be a low accuracy of a detection result output from the detector 12. When the number of matches decreases, a tracking accuracy of an object decreases. Accordingly, when the matching number is decreased, the controller 11 more frequently selects a high-accuracy detector 12 in order to detect the high-accuracy Bbox and increase the matching number. By this control, it is possible to prevent decrease of the object tracking accuracy. In other than this point, since the object tracking device 20 in the second example embodiment operates in the same manner as the object tracking device of the first example embodiment, explanations thereof will be omitted.

Third Example Embodiment

Figure 10:
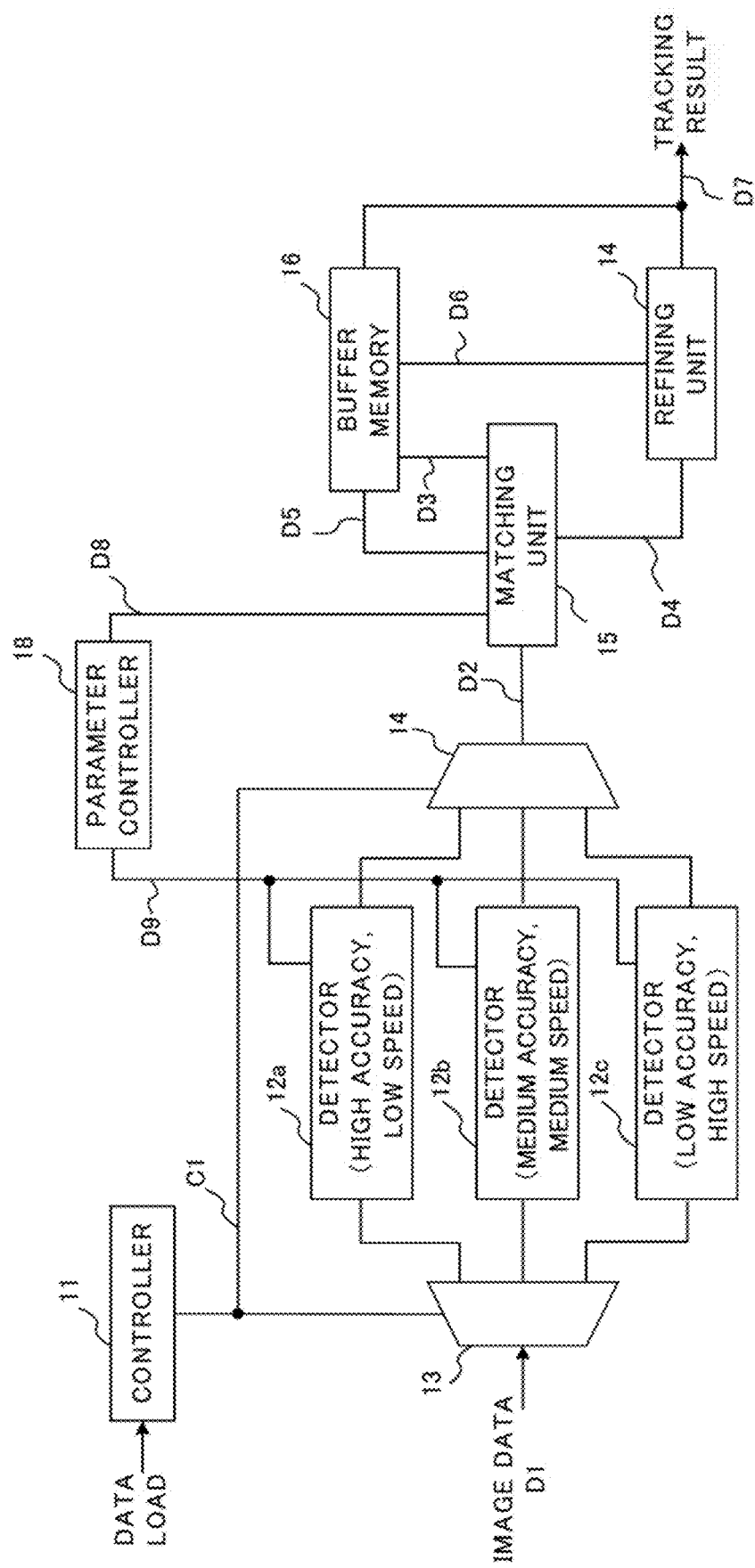
FIG. 10 is a block diagram illustrating a functional configuration of an object tracking device according to a third example embodiment.

Next, a third example embodiment will be described. A hardware configuration of an object tracking device according to the third example embodiment is the same as that of the first example embodiment shown in FIG. 2. FIG. 10 is a block diagram illustrating a functional configuration of an object tracking device 30 according to the third example embodiment. Different from the first example embodiment, in the third example embodiment, parameters in each detector 12 is adjusted in accordance with a matching result by the matching unit 15; however, other operations are the same as those in the first example embodiment. Specifically, as illustrated in FIG. 10, a parameter controller 18 is provided, the matching result D8 is supplied from the matching unit 15 to the parameter controller 18. Also, the parameter controller 18 supplies a parameter control signal D9 to each detector 12 based on the matching result D8. In other operations, a configuration of an object tracking device 30 in the third example embodiment is the same as the configuration of the object tracking device 10 in the first example embodiment.

In the third example embodiment, when the matching number by the matching unit 15 has decreased, internal parameters of each of the detectors 12 are corrected so that a larger number of Bboxes from each of the detectors 12 are output. In a case in which the number of Bboxes outputted from the detector 12 is reduced, the number of Bboxes to be matched, that is, the matching number for the matching unit 5 is reduced. Thus, when the matching number is decreased, more Bboxes are output from the detector 12 in order to increase the matching number, so that a decrease in the object tracking accuracy is prevented.

A method for the parameter controller 18 to adjust the parameters of each detector 12 depends on an internal configuration of each detector 12. In general, each of the detectors 12 detects a plurality of Bboxes with respect to the same object in one of various methods in a course of an object detection process, integrates them, and outputs Bboxes as an object detection result. There are several methods to integrate several Bboxes. A first method is to calculate an IoU (Intersection over Union) value of each Bbox by NMS (Non Maximum Suppression), to remove the IoU value being equal to or lower than a predetermined threshold value, and to output a remaining Bbox. A second method is to compare reliability of each of the plurality of Bboxes with a predetermined threshold value, and to output a Bbox of which the reliability is higher than a threshold value. A third method is to use the IoU value and the reliability together.

When the detector 12 employs the first method, the parameter controller 18 decrease the threshold value of the IoU value set in the detector 12 by the parameter control signal D9 in a case of decreasing the matching number. When the detector 12 employs the second method, the parameter controller 18 decreases the threshold value of the reliability set in the detector by the parameter control signal D9 in a case of decreasing the matching number. Moreover, when the detector 12 employs the third method, the parameter controller 18 increases the threshold value of the IoU value set in the detector 12, decreases the threshold value of the reliability set in the detector 12 in response to the parameter control signal D9, or performs both. By this operation, the number of Bboxes output from the detector 12 is increased, and it is possible to increase the number of matchings by the matching unit 15. As a result, it is possible to suppress accuracy reduction of the tracking result. In other controls, since the object tracking device 30 in the third example embodiment operates in the same manner as the object tracking device in the first example embodiment, explanations thereof will be omitted.

Note that detection accuracies and processing speeds of the plurality of detectors 12a to 12c provided in the object tracking device 30 are different, and in many cases, different object detection algorithms are used. In that case, the parameter controller 18 may supply the parameter control signal D9 corresponding to the object detection algorithm of each detector 12. That is, in a case in that the detector 12a employs the first method described above and the detector 12b employs the second method, the parameter controller 18 may provide the parameter control signal D9 for decreasing the threshold value of the IoU value with respect to the detector 12a, and may provide the parameter control signal D9 for decreasing the threshold value of the reliability with respect to the detector 12b.

Fourth Example Embodiment

Figure 11:
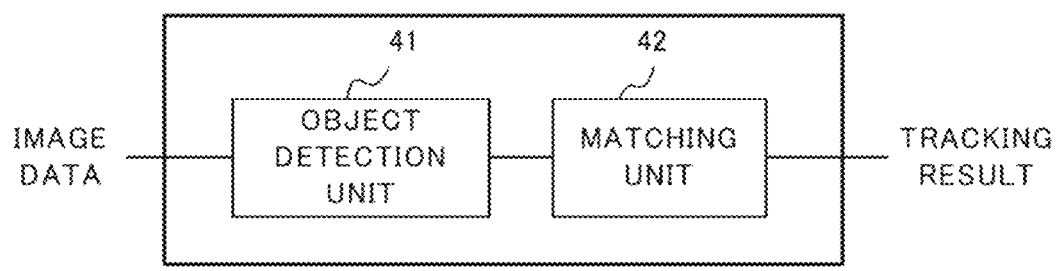
FIG. 11 is a block diagram illustrating a functional configuration of an object tracking device according to a fourth example embodiment.

Next, a fourth example embodiment of the present invention will be described. FIG. 11 is a block diagram illustrating a functional configuration of an object tracking device 40 according to the fourth example embodiment. Note that the object detecting device 40 is realized by the hardware configuration depicted in FIG. 2.

The object tracking device 40 includes an object detection unit 41 and a matching unit 42. The object detection unit 41 includes a plurality of detectors having different processing speeds or accuracies. The object detection unit 41 detects an object from image data using one detector selected from the plurality of detectors for each frame of the image data input in time series. The matching unit 42 performs matching between a current object detection result generated by the object detection unit from the image data of the current frame and a previous object detection result generated by the object detection unit from the image data of a frame before the current frame, and generates a tracking result of the object based on a result of the matching.

The whole or part of the example embodiments disclosed above can also be described as, but not limited to, the following supplementary notes.

(Supplementary Note 1)

An object tracking device comprising:

an object detection unit configured to include a plurality of detectors having different processing speeds or accuracies and to detect, for each of frames of image data input in time series, each object from the image data using one detector selected from the plurality of the detectors; and a matching unit configured to match a current object detection result which the object detection unit generates from image data of a current frame with a previous object detection result which the object detection unit generates from image data of a previous frame before the current frame, and generate a tracking result of the object based on a matching result.

(Supplementary Note 2)

The object tracking device according to supplementary note 1, wherein the object detection result includes an image of a boundary region including the detected object, and the matching unit performs matching by using an evaluation index based on a color histogram for each of partial regions obtained by dividing the boundary region into a predetermined number.

(Supplementary Note 3)

The object tracking device according to supplementary note 2, wherein the object detection result includes information indicating detection accuracy, and the object tracking device further includes a correction unit configured to correct one object detection result of low detection accuracy by using another object detection result of high detection accuracy among two object detection results in which the matching has succeeded.

(Supplementary Note 4)

The object tracking device according to supplementary note 3, wherein the correction unit corrects a size of one boundary region included in the object detection result of the low detection accuracy based on a size of another boundary region included in the object detection result of the high detection accuracy among the two object detection results in which the matching has succeeded.

(Supplementary Note 5)

The object tracking device according to supplementary note 3 or 4, wherein the correction unit corrects a position of one boundary region included in the object detection result of the low detection accuracy based on a position of another boundary region included in the object detection result of the high detection accuracy among the two object detection results in which the matching has succeeded.

(Supplementary Note 6)

The object tracking device according to supplementary note 5, wherein among the two object detection results in which the matching has succeeded, the correction unit calculates the evaluation index based on the color histogram for each of the partial regions with respect to a boundary region being moved while moving a position of the boundary region included in the object detection result of the low detection accuracy, and moves the boundary region included in the object detection result of the low detection accuracy to a position where the calculated evaluation index is closest to the evaluation index calculated with respect to the boundary region included in the object detection result of the high detection accuracy.

(Supplementary Note 7)

The object tracking device according to any one of supplementary notes 3 through 6, further comprising a storage unit configured to store the previous object detection result, wherein the matching unit acquires the previous object detection result from the storage unit and performs the matching, and the correction unit acquires the object detection result of the high detection accuracy from the storage unit, thus performs a correction, and stores the corrected object detection result in the storage unit.

(Supplementary Note 8)

The object tracking device according to any one of supplementary notes 3 through 7, wherein information indicating the detection accuracy is identification information for the plurality of detectors.

(Supplementary Note 9)

The object tracking device according to any one of supplementary notes 3 through 8, wherein the object detection unit detects an object by using a detector of the highest detection accuracy among the plurality of detectors for every predetermined number of frames.

(Supplementary Note 10)

The object tracking device according to supplementary note 9, wherein the object detection unit increases a ratio for using the detector of the highest detection accuracy when a number of matches by the matching unit decreases below a predetermined reference value.

(Supplementary Note 11)

The object tracking device according to supplementary note 9 or 10, wherein the object detection unit adjusts an object detection reference in the detector in order to detect more boundary regions when the number of matches by the matching unit decreases below a predetermined reference.

(Supplementary Note 12)

An object tracking method, comprising:

detecting each object from image data by using one detector selected from a plurality of detectors having different processing speeds or accuracies for each of frames of the image data input in time series and generating an object detection result; and matching a current object detection result generated from image data of a current frame with a previous object detection result generated from image data of a previous frame before the current frame, and generating a tracking result of the object based on a matching result.

(Supplementary Note 13)

A recording medium recording a program, the program causing a computer to perform a process comprising:

detecting each object from image data by using one detector selected from a plurality of detectors having different processing speeds or accuracies for each of frames of the image data input in time series and generating an object detection result; and matching a current object detection result generated from image data of a current frame with a previous object detection result generated from image data of a previous frame before the current frame, and generating a tracking result of the object based on a matching result.

While the invention has been described with reference to the example embodiments and examples, the invention is not limited to the above example embodiments and examples. It will be understood by those of ordinary skill in the art that various changes in form and details may be made therein without departing from the spirit and scope of the present invention as defined by the claims.

DESCRIPTION OF SYMBOLS 1, 10, 20, 30, 40 Object tracking device
3 Processor
8 Camera
11 Controller
12 Detector
13, 14 Selectors
15 Matching unit
16 Buffer memory
17 Refining unit
18 Parameter controller

What is claimed is:

1. An object tracking device comprising:
a memory storing instructions; and
one or more processors configured to execute the instructions to:
detect, for each of a plurality of frames of image data input in time series, an object from the image data using one detector selected from a plurality of the detectors having different processing speeds or accuracies;
output, for each frame, an object detection result including an image of a boundary region including the detected object and information indicating detection accuracy;
match a current object detection result for a current frame with a previous object detection result for a previous frame before the current frame, by using an evaluation index based on a color histogram for each of a plurality of partial regions obtained by dividing the boundary region into a predetermined number;
generate a tracking result of the object based on a matching result; and
correct a size of the boundary region included in a first object detection result of which the detection accuracy is specified as a low detection accuracy based on a size of the boundary region included in a second object detection result having of which the detection accuracy is specified as a high detection accuracy, among two object detection results for which matching has succeeded.

2. The object tracking device according to claim 1, wherein the processor is configured to execute the instructions to correct a position of the boundary region included in the first object detection result based on a position of the boundary region included in the second object detection result.

3. The object tracking device according to claim 2, wherein among the two object detection results in which the matching has succeeded, the processor is configured to execute the instructions to calculate the evaluation index based on the color histogram for each of the partial regions with respect to a boundary region being moved while moving the position of the boundary region included in the first object detection result; and to move the boundary region included in the first object detection result to a position where the calculated evaluation index is closest to the evaluation index calculated with respect to the boundary region included in the second object detection result.

4. The object tracking device according to claim 1, wherein the memory is further configured to store the previous object detection result,
wherein the processor is configured to execute the instructions to acquire the previous object detection result from the memory, and
wherein the processor is configured to acquire the second object detection result of the high detection accuracy from the memory, and store the first object detection result as has been corrected.

5. The object tracking device according to claim 1, wherein the information indicating the detection accuracy is identification information for the plurality of detectors.

6. The object tracking device according to claim 1, wherein the processor is configured to execute the instructions to detect the object by using the one detector having a highest detection accuracy for every predetermined number of frames.

7. The object tracking device according to claim 6, wherein the processor is configured to execute the instructions to increase a ratio for using the one detector having the highest detection accuracy when a number of matches decreases below a predetermined reference value.

8. The object tracking device according to claim 6, wherein the processor is configured to execute the instructions to adjust an object detection reference in the one detector having the highest detection accuracy in order to detect more boundary regions when the number of matches decreases below the predetermined reference.

9. An object tracking method performed by a computer and comprising:
detecting, for each of a plurality of frames of image data input in time series, an object from the image data using one detector selected from a plurality of the detectors having different processing speeds or accuracies;
outputting, for each frame, an object detection result including an image of a boundary region including the detected object and information indicating detection accuracy;
matching a current object detection result for a current frame with a previous object detection result for a previous frame before the current frame, by using an evaluation index based on a color histogram for each of a plurality of partial regions obtained by dividing the boundary region into a predetermined number;
generating a tracking result of the object based on a matching result; and
correcting a size of the boundary region included in a first object detection result of which the detection accuracy is specified as a low detection accuracy based on a size of the boundary region included in a second object detection result having of which the detection accuracy is specified as a high detection accuracy, among two object detection results for which matching has succeeded.

10. A non-transitory computer-readable recording medium storing a program executable by a computer to perform a process comprising:
detecting, for each of a plurality of frames of image data input in time series, an object from the image data using one detector selected from a plurality of the detectors having different processing speeds or accuracies;
outputting, for each frame, an object detection result including an image of a boundary region including the detected object and information indicating detection accuracy;
matching a current object detection result for a current frame with a previous object detection result for a previous frame before the current frame, by using an evaluation index based on a color histogram for each of a plurality of partial regions obtained by dividing the boundary region into a predetermined number;
generating a tracking result of the object based on a matching result; and
correcting a size of the boundary region included in a first object detection result of which the detection accuracy is specified as a low detection accuracy based on a size of the boundary region included in a second object detection result having of which the detection accuracy is specified as a high detection accuracy, among two object detection results for which matching has succeeded.

11. The object tracking device according to claim 1, wherein at a time of selecting the one detector among the plurality of detectors, the one or more processors are configured to execute the instructions to select the detector having a highest detection accuracy once for every predetermined number of frames.

* * * * *